(12) United States Patent
Shelton et al.

(10) Patent No.: US 11,977,871 B2
(45) Date of Patent: May 7, 2024

(54) IMAGE TRANSFER

(71) Applicant: Hewlett-Packard Development Company, L.P., Spring, TX (US)

(72) Inventors: Gerold Keith Shelton, Boise, ID (US); Matthew Frederickson, Spring, TX (US); Kyle James Nottingham, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 216 days.

(21) Appl. No.: 17/418,270

(22) PCT Filed: Apr. 15, 2019

(86) PCT No.: PCT/US2019/027468
§ 371 (c)(1),
(2) Date: Jun. 25, 2021

(87) PCT Pub. No.: WO2020/214143
PCT Pub. Date: Oct. 22, 2020

(65) Prior Publication Data
US 2022/0027136 A1 Jan. 27, 2022

(51) Int. Cl.
*G06F 9/00* (2018.01)
*G06F 8/61* (2018.01)
*G06F 15/177* (2006.01)
*G06F 21/64* (2013.01)

(52) U.S. Cl.
CPC ............... *G06F 8/63* (2013.01); *G06F 21/64* (2013.01)

(58) Field of Classification Search
CPC ..................... G06F 8/63; G06F 21/64
See application file for complete search history.

(56) References Cited

U.S. PATENT DOCUMENTS

| | | | |
|---|---|---|---|
| 7,971,059 B2 | 6/2011 | Calman et al. | |
| 8,489,719 B2 | 7/2013 | Ben-Shaul et al. | |
| 9,037,854 B2 | 5/2015 | Roth et al. | |
| 9,191,479 B2 | 11/2015 | Amberny et al. | |
| 9,237,202 B1 * | 1/2016 | Sehn | H04L 67/568 |
| 9,286,310 B1 | 3/2016 | Emelyanov et al. | |
| 9,600,291 B1 * | 3/2017 | Atsatt | G06F 21/6218 |
| 9,647,918 B2 | 5/2017 | Raleigh et al. | |
| 9,830,111 B1 | 11/2017 | Patiejunas et al. | |
| 10,007,577 B2 | 6/2018 | Bronk | |
| 10,084,327 B2 | 9/2018 | Roberts | |

(Continued)

FOREIGN PATENT DOCUMENTS

| | | |
|---|---|---|
| CN | 103024437 A | 4/2013 |
| CN | 109617158 A | 4/2019 |

(Continued)

*Primary Examiner* — Mohammed H Rehman
(74) *Attorney, Agent, or Firm* — Quarles & Brady LLP

(57) ABSTRACT

An example device for image transfer can include a memory device, a service cubby to house a computing device and coupled to the memory device, a controller coupled to the memory device. The controller can retrieve, from the memory device, an image requested for transfer to the computing device in the memory device, perform an integrity check on the image, and transfer, via a local network of the device, the image to the computing device while the computing device is coupled to the service cubby.

15 Claims, 5 Drawing Sheets

(56) References Cited

U.S. PATENT DOCUMENTS

| | | | |
|---|---|---|---|
| 2003/0055876 A1* | 3/2003 | Korala | H04N 1/0044 |
| | | | 705/26.1 |
| 2005/0138409 A1* | 6/2005 | Sheriff | G06F 21/575 |
| | | | 726/26 |
| 2006/0236125 A1* | 10/2006 | Sahita | G06F 21/31 |
| | | | 713/193 |
| 2007/0150887 A1* | 6/2007 | Shapiro | G06F 16/00 |
| | | | 717/174 |
| 2009/0319392 A1 | 12/2009 | Baum et al. | |
| 2012/0278597 A1 | 11/2012 | De Atley et al. | |
| 2013/0117137 A1* | 5/2013 | Klein | G07F 17/26 |
| | | | 705/16 |
| 2013/0254383 A1 | 9/2013 | Wray | |
| 2014/0089077 A1* | 3/2014 | Zuckerman | G07F 17/0064 |
| | | | 705/26.8 |
| 2014/0109047 A1 | 4/2014 | Yu | |
| 2016/0011878 A1* | 1/2016 | Chandra | G06F 12/0246 |
| | | | 711/103 |
| 2016/0098264 A1 | 4/2016 | Proschowsky | |
| 2017/0371680 A1* | 12/2017 | Chandrasekhar | G06F 3/0604 |
| 2018/0089435 A1* | 3/2018 | Zander | G06F 21/577 |
| 2018/0121191 A1* | 5/2018 | Fodor | H04L 41/082 |
| 2018/0189081 A1* | 7/2018 | Upasani | G06F 9/4401 |
| 2018/0247082 A1 | 8/2018 | Durham et al. | |
| 2019/0051266 A1* | 2/2019 | Chaudhari | G09G 5/003 |

FOREIGN PATENT DOCUMENTS

| | | |
|---|---|---|
| TW | 513647 | 12/2002 |
| TW | 201517547 A | 5/2015 |

\* cited by examiner

IMAGE TRANSFER

BACKGROUND

Images may be used for computing backup, program installation, and/or updating, among others. A plurality of image types exists. A system image is a serialized copy of an entire state of a computer. A drive image is a disk-cloning package. A device image, also known as a disk image, includes the contents and structure of a disk volume or entire data storage device. An ISO image is a device image of an optical disk.

DETAILED DESCRIPTION

Figure 1:
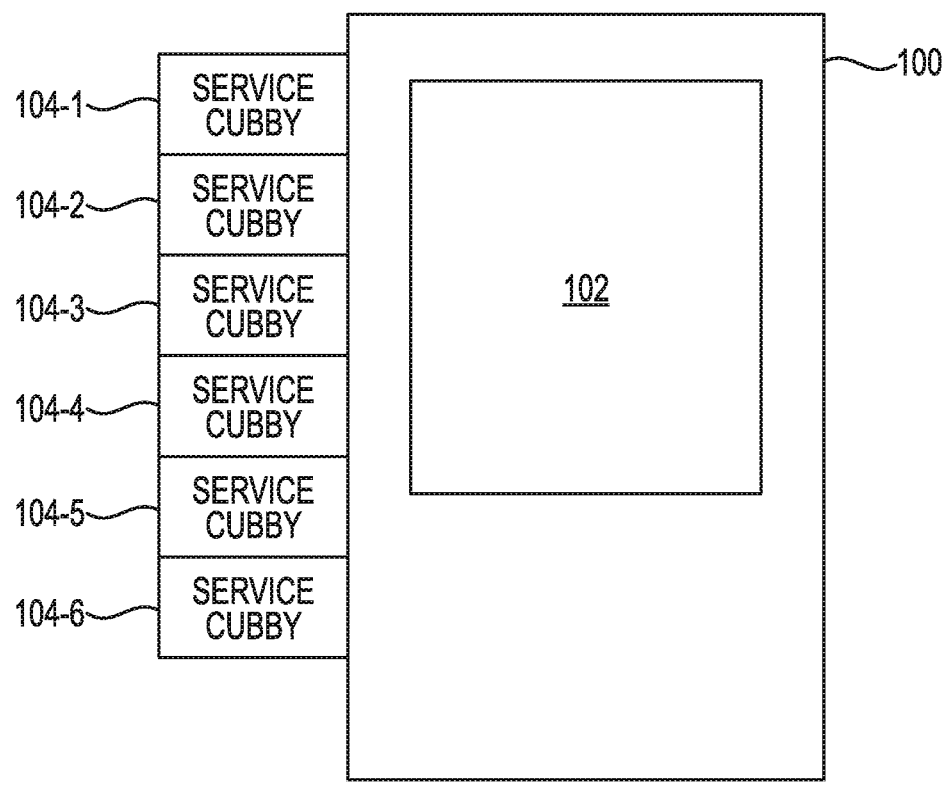
FIG. 1 is an example device for image transfer consistent with the present disclosure.

Updating a computing device can include transferring an image from a memory device to the computing device. An image can include images having full copies of standard setups, software upgrades, user configurations, device configurations, settings, operating system information, software, etc. As used herein, an image can include a system image, a drive image, a device image, an ISO image, a software image, other image types, user configurations, software configurations, hardware configurations, or any combination thereof, among others.

As used herein, a computing device can be a mechanical or electrical device that transmits or modifies energy to perform or assist in the performance of human tasks. Examples include personal computers, laptops, tablets, smartphones, mobile devices, and gaming consoles, among others. Updating a computing device can include configuration of a computing device, reconfiguration of a computing device, updating software, updating an operating system, or a combination thereof. Other updates and/or changes may also be performed using image transfer as described herein. Image transfer, as used herein, may also be used to create backups of software, software, configurations, operating systems, or other elements of a computing device or to install programming on computing devices, among other uses.

Some approaches to image transfer include transferring images across a network (e.g., the cloud, the Internet, an office network, etc.) at the same time it is installed on the computing device. Such approaches leave the computing device vulnerable to bricking or network issues. For example, if there is a network issue or interruption during image transfer, the process may cease, and installation/transfer may have to be restarted. Additionally, a network issue may damage or "brick" the computing device. For example, a security issue with the network may be passed onto the computing device during the image transfer causing the computing device to cease functioning. Additionally, if multiple computing devices are receiving the same image transfer, such approaches require the image to be transferred multiple times over the network, which may cause network slowdowns and reduced network bandwidth.

Some other approaches to image transfer rely on available local storage on the computing device. However, a computing device, for instance a smartphone, may not have sufficient available storage to receive an image transfer, or the image transfer may be slowed.

In contrast, examples of the present disclosure allow for servicing of a computing device (e.g., via image transfer) in a device (e.g., kiosk) format. The device can house storage coupled to a plurality of service cubbies that can store computing devices. In some examples, images may be temporarily stored, and integrity checks can be performed on the images before transfer to a computing device. An image can be transferred to the computing device via a local network within the device, and the temporarily stored image can then be removed. By doing so, the computing device is protected from network issues or failures, and the device provides storage, such that limited storage on a computing device does not hinder image transfer. In addition, by storing the image locally, an image doesn't need to be transferred over a network each time it is requested, which can reduce network bandwidth consumption. Image transfer, as used herein, can include the transfer of the image to and installation of the image on the computing device.

FIG. 1 is an example device 100 for image transfer consistent with the present disclosure. The device 100 illustrated in FIG. 1 is a kiosk (e.g., a device-as-a-service (DaaS) kiosk), but other devices may be possible. The device 100 can include a display 102 with which a user can interact and a plurality of service cubbies 104-1, 104-2, . . . , 104-6 (hereinafter referred to collectively as storage cubbies 104) for storage of computing devices. Mile six service cubbies 104 are illustrated in FIG. 1, more or fewer service cubbies 104 may be present.

The device 100 can be connected, via a network, to a database or administration platform where stored profiles can be accessed, and a clean image can be retrieved. For instance, the device 100 may have a wired or wireless network connection to a drive. However, in some examples, the device 100 is not network connected. Rather, images may be transferred to the device 100 by a service technician. Once on the device 100, the images are stored locally (e.g., permanently or temporarily) in a memory device of the device, such the network interruptions or issues do not affect the stored images. The memory device may be a single memory device, a plurality of memory devices, or a partitioned memory device, among others.

The memory device may store software (e.g., direct software downloads) to control transfer and/or installation of the transferred image, which allows for partial or complete reimaging of a computing device without using an external storage point for the reimaging. In addition to images and installation software, the memory device may store settings files, XML files, and full or partial operating system images, among others.

Service cubbies 104 may store or be capable of storing computing devices. Each service cubby 104 may include power, communication capabilities, and/or connection to a local network. In some examples, each service cubby 104 may have its own local network. In such an example, the memory device can be connected to the network of each cubby 104, and a storage device such as a portable drive, an installed drive, a hot-swappable drive, a large-capacity drive, non-transitory computer-readable medium, flash drive, set of drives, or other storage device may be attached somewhere in the device 100.

Individual storage devices may be housed in each service cubby 104 and may be available on the local network as a device active within the service cubby 104. In some examples, individual storage devices may be coupled to the individual service cubbies 104 from a central point within the device 100. For example, a user may receive a request, via display 102 (or via another notification method), to retrieve a storage device from a housing in the device 100 (not illustrated in FIG. 1). The user may be instructed to connect the storage device to the device 100 for use in upgrading, refreshing, or imaging of their computing device housed in one of the service cubbies 104. In some examples, such storage devices may be permanently installed and made available to a service technician (e.g., via a back panel or service access point). In some instances, a single disk or array of disks may be partitioned allowing each service cubby 104 to access a portion of the storage.

Device 100 may include other elements not illustrated in FIG. 1, such as the aforementioned housing. In addition, device 100 may have a different design than illustrated in FIG. 100. For instance, the service cubbies 104 may be located on the right side of the device 100 or in some other location.

Figure 2:
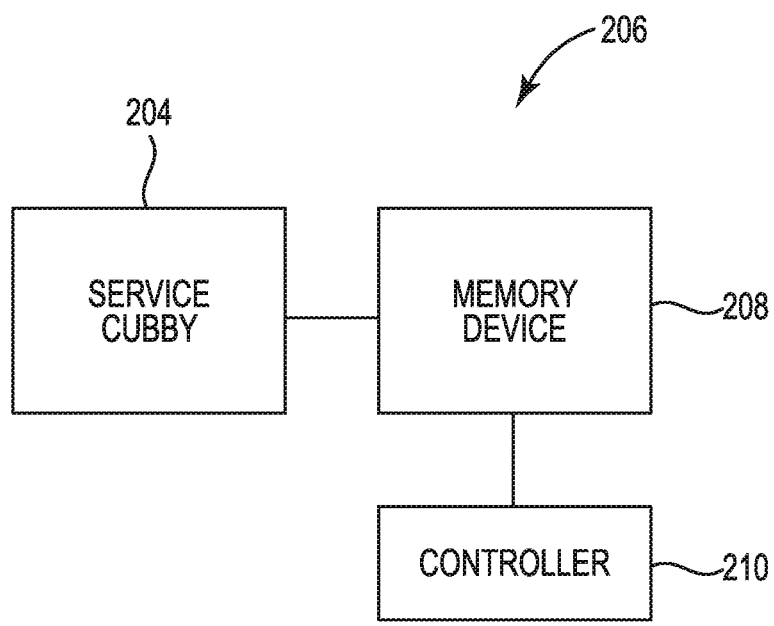
FIG. 2 is another example device for image transfer consistent with the present disclosure.

FIG. 2 is another example device 206 for image transfer consistent with the present disclosure, Device 206 may be a kiosk such as kiosk 100 illustrated in FIG. 1, may be located within a kiosk such as kiosk 100 illustrated in FIG. 1, or may be coupled to kiosk such as kiosk 100 illustrated in FIG. 1. In some examples, device 206 is a DaaS kiosk. Device 206 can include a memory device 208 and a service cubby 204 coupled to memory device 208 to house a computing device. For instance, the service cubby 204 can house/store a computing device while an image is being transferred to the computing device from the memory device 208. The service cubby 204 can also store the computing device before image transfer or after image transfer. In some examples, service cubby 204 includes power, communication capabilities, and connection to a local network to facilitate the image transfer. Service cubby 204 may have its own local network in some instances.

The memory device 208 can be a portable drive, an installed drive, a hot-swappable drive, a large-capacity drive, a partitioned drive, a memory array, a partitioned memory array, or other storage device. The memory device 208 can permanently or temporarily store an image (e.g., for transfer to a computing device located in service cubby 204). For example, an image to be transferred to a computing device can be downloaded to and stored in the memory device 208 temporarily such that the content stored is specific to the computing device to be serviced. In some examples, common images, such as those used in a device refresh, may be stored permanently or temporarily to be supplied a computing device located in service cubby 204 or to a plurality of computing devices in a plurality of services cubbies, such as service cubbies 304 illustrated in FIG. 3. In some examples, images are downloaded to the memory device 208 from a main server connected to the device 206 via a network. In some examples, the main server can manage the device 206 and the images. The images, in some instances, may be transferred to the memory device by a service technician (e.g., if the device 206 is not network connected).

The memory device 208 can be coupled to a controller 210, and the controller 210 can recognize the memory device 208 as a place where content (e.g., images, configurations, etc.) may be permanently stored, temporarily stored, or stored for the purpose of configuration of an image. In some examples, the memory device 208 can be accessed for configurations for final customization (e.g., username settings, password settings, etc.).

The controller 210 can retrieve, from the memory device 208, an image requested for transfer to the computing device in the memory device 208. For instance, a user may request from device 206 that his or her computing device be updated per instructions from an employer. The user may place the computing device in the service cubby 204, and the computing device can be connected (e.g., wired or wirelessly) to the device 206 and memory device 208 via a local area network of device 206 or of service cubby 204. Device 206 can recognize the device upon connection and automatically request the image for transfer, or the user can interact with the device 206 (e.g., via a display or other input device) to request the image transfer. Upon receipt of the request, the image is retrieved from the memory device 208. In some instances, prior to the retrieval, an existing image from the computing device can be transferred to the device 206 (e.g., to the memory device 208) to create a backup image prior to transfer of the requested image from the memory device 208 to the computing device.

In some examples, responsive to the request and retrieval, controller 210 can perform an integrity check on the image. The integrity check can occur before image transfer to the computing device. For instance, a bit comparison scheme, file verification scheme, a check-sum scheme, or other integrity checking scheme can be applied to the image. The integrity check can confirm that the image is accurate, without corruption, and ready to be transferred to and installed on the computing device. By performing the integrity check on the device 206 (e.g., while still in memory device 208) rather than on the computing device, integrity problems can be isolated from the computing device.

In some instances, controller 210 can transfer the image from the memory device 208 to the computing device while the computing device is coupled to the service cubby 204. This transfer can occur via the local network of the device 206, the local network of the service cubby 204, or both. Transferring via the local network instead of a wide-area network, for example, can prevent network interrupts or slow data transfers from causing image transfer failures.

As noted above, in some examples, the image is stored in memory device 208 temporarily. The temporarily stored image can be removed after a threshold time period. For instance, the device 206 "cleans up" after itself by deleting the temporarily stored image after successful image deployment to the computing device. Put another way, the temporarily stored image is removed upon completion of transfer of the image to the computing device which may include installation onto the computing device. In some examples, the threshold time period is a specified period of time or is a time period it takes for the successful image deployment to occur. In some examples, the temporarily stored image is stored for the threshold time period in anticipation of future fixes (e.g., one to two weeks after successful deployment on final computing device).

Figure 3:
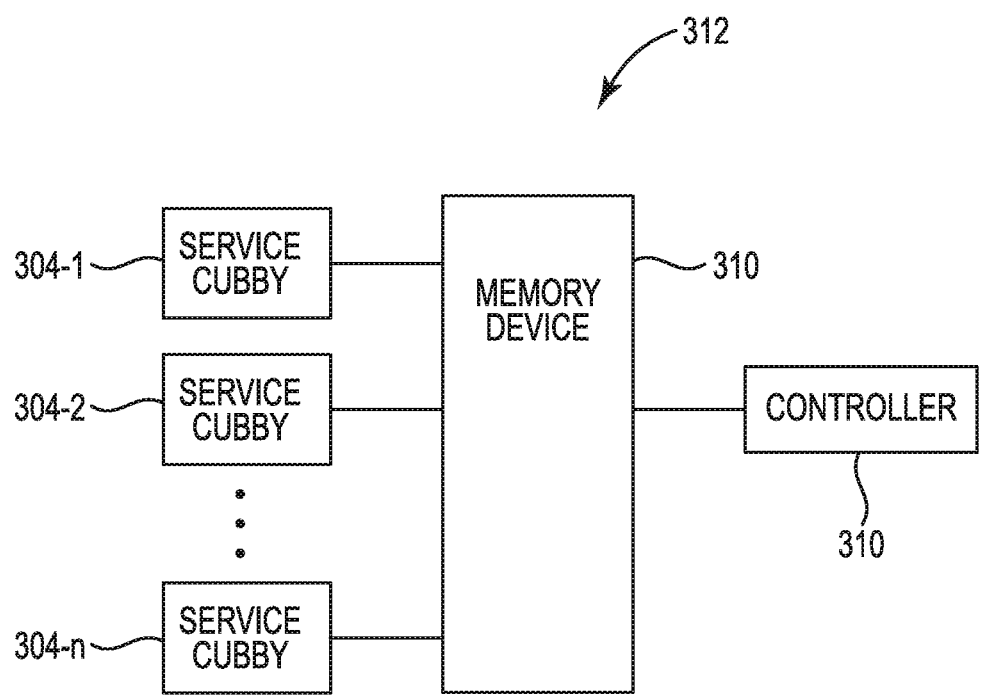
FIG. 3 is yet another example device for image transfer consistent with the present disclosure.

FIG. 3 is yet another example device 312 for image transfer consistent with the present disclosure. In some embodiments, device 312 may be analogous to device 206 illustrated in FIG. 2. Device 312 may be a kiosk such as kiosk 100 illustrated in FIG. 1, may be located within a kiosk such as kiosk 100 illustrated in FIG. 1, or may be coupled to kiosk such as kiosk 100 illustrated in FIG. 1. Device 312 includes a memory device 308, a plurality of service cubbies 304-1, 304-2, . . . , 304-*n* (hereinafter referred to collectively as service cubbies 304) coupled to the memory device 308, and a controller 310 coupled to the memory device 308.

Service cubbies 304 can facilitate physical storage of computing devices. For instance, service cubby 304-1 can be a physical cubby to house a laptop to be serviced while service cubby 304-2 is a physical cubby to house a mobile device to be serviced. The service cubbies 304 may be drawers, doors, or other compartment-type or barrier. The service cubbies 304 may be locked with limited access for security. At a given time, one, some, all, or none of the service cubbies 304 may store computing devices. The computing devices may be awaiting service, undergoing service, or have completed service while stored in service cubbies 304. Service, as used herein, can include image transfer and/or installation and configuration.

Each service cubby 304 has storage (individual, partitioned, or other), network access (local or access to wide area), power, communication connections, fire and other physical damage protection, a firewall, and/or other network security features such as a Faraday cage. For instance, a computing device housed in a service cubby 304 may be isolated and protected from other computing devices connected to the device 312 or an associated network. In some examples, the memory device 308 is a drive set (e.g., a redundant array of independent discs (RAID)), with each service cubby 304 assigned a partition. In other examples, each service cubby 304 has its own memory device or shared storage with the device 312 or another service cubby 304.

Controller 310 can store on the memory device 308 an existing image of a first computing device responsive to coupling of the first computing device of the plurality of computing devices to the device 312. For instance, upon connection of the first computing device to the first service cubby 304-1, the first computing device is recognized. A user can request an update or other service to the first computing device or the device 312 can automatically recognize the first computing device and needed service. The existing image which may include applications or other information that is outdated, unsupported, etc, is transferred from the first computing device to the device 312 for storage on the memory device 308. In some examples, the existing image can include configuration information associated with the first computing device that may or may not be outdated and/or unsupported. In some examples, the existing image may be stored in the memory device 308 until a new image can be transferred to the first computing device or until the existing image can be updated on the first computing device with service packs, changes, etc. on the first computing device.

In some examples, a user may take a computing device to the device 312 for an update, reconfiguration, etc. In such an example, the user may not be replacing the computing device, but he or she may still want to retain configurations such as user settings, software, etc. In such an example, the existing image is transferred from the computing device to the device 312 for storage on the memory device 308. Once the existing image is stored, controller 310 can retrieve from the memory device 308 a new image for transfer to the computing device.

In other examples, a user may take a laptop with a broken screen to the device 312, The user may want to replace his or her laptop, but may want to retain user settings, software, etc. for the replacement laptop. In such an example, the user can place the laptop in one of the service cubbies 304, and the desired existing image (and associated configuration information) can be transferred to the memory device 308. Device 312, for instance using controller 310, can transfer the new image stored on the memory device 308 to the new laptop and delete the existing image upon successful deployment of the new image.

In some examples, controller 310 can perform an integrity check of the new image and transfer, via a local network of a first service cubby 304-1 of the plurality of service cubbies, the new image to the first computing device while the computing device is in the first service cubby 304-1. For instance, prior to the transfer, an integrity check scheme such as a check sum scheme can be performed on the image to be transferred to confirm its integrity. If the integrity check result is positive, the image may be transferred. If the integrity check result is negative, the transfer can be aborted to prevent corruption of the first computing device, for example.

Controller 310 can remove the existing image of the first computing device and the new image from the memory device 308 after a threshold time period. The threshold time period, in some examples, includes the time it takes to transfer the new image successfully or a particular time period after the successful transfer.

In some examples, a second computing device can be coupled to the device 312, and in response, an existing image of the second computing device can be stored on the memory device 308. The new image described with respect to the first computing device can be retrieved from the memory device 308 for transfer to the second computing device, and an integrity check of the new image can be performed. Similar to the first computing device, the new image can be transferred via a local network within the device (e.g., a local network of a second service cubby 304-2 storing the second computing device) while the second computing device is in the second service cubby 304-2. In some examples, the different existing images (e.g., of the first computing device and the second computing device) can include individualized configurations for the users and their computing devices. For instance, the first user may be a sales employee, while the second user is a manager. Following transfer of the new image to the respective computing devices, the first computing device (of the first user) retains its sales employee configurations, while the second device (of the second user) retains its manager configurations.

The existing image of the second computing device and the new image from the memory device 308 can be removed after a threshold time period. In some examples, the threshold time period can include a time it takes for the device 312 and the controller 310 to transfer the new image to a particular number of computing devices. For example, if multiple users plan to update company-secured mobile devices, existing images transferred from their individual mobile devices, as well as the new image, can be removed from the memory device 308 upon deployment to each computing device that was to receive the update.

The device 312 may be coupled to a network to receive updates and downloads of images, but in some examples, the device 312 may not be coupled to an external network. For example, a service technician may load the images onto the device 312 manually. This may be useful in situations where the device 312 is in a location not allowed to have network access (e.g., for security purposes). The service technician may copy over a plurality of images to be used for a certain time period and can return to add more as needed. The images may be removed automatically (e.g., after a threshold period of time) or by actions of the service technician.

Figure 4:
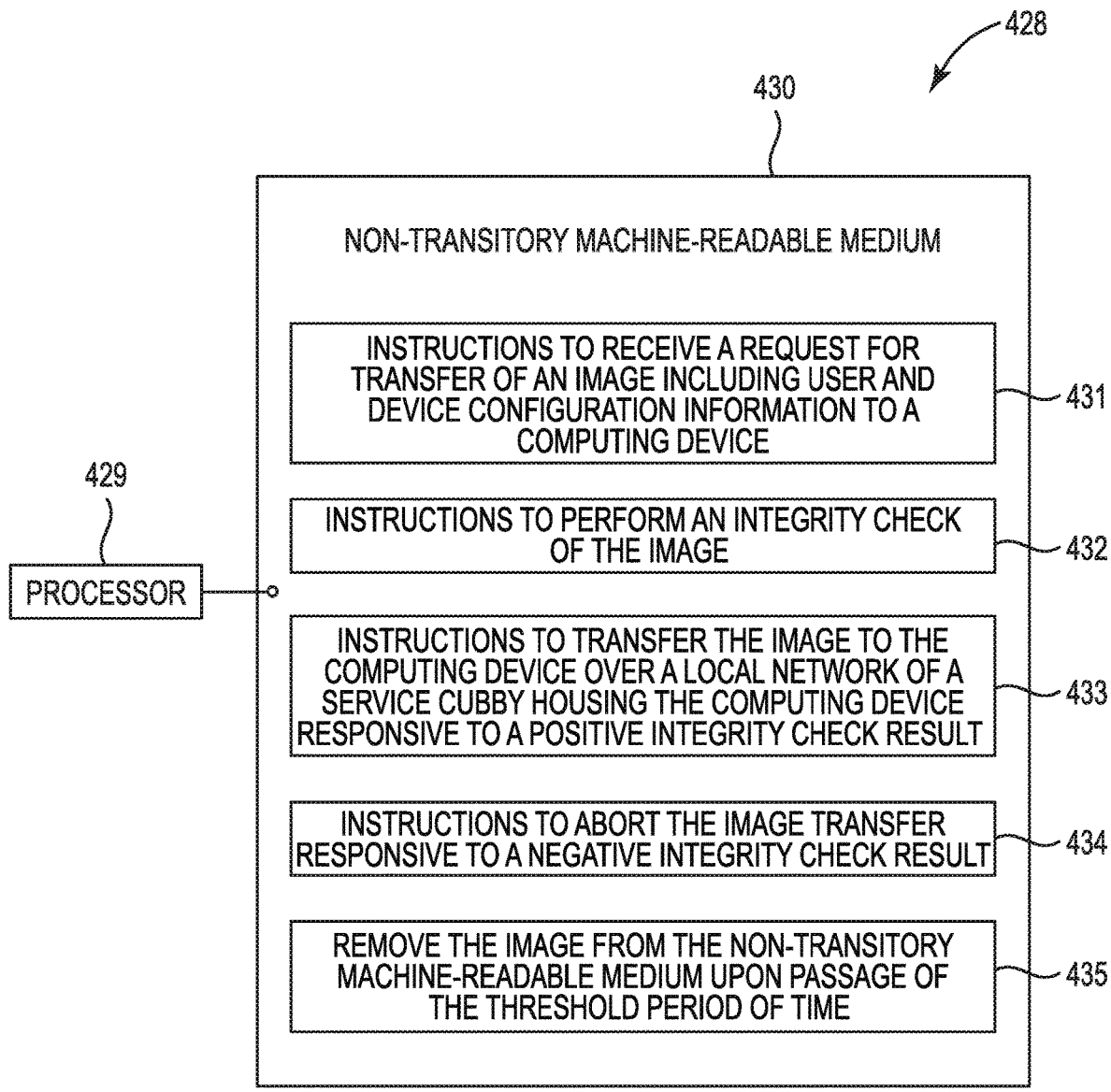
FIG. 4 is an example system for image transfer consistent with the present disclosure.

FIG. 4 is an example system 428 for image transfer consistent with the present disclosure. System 428 can be a computing device in some examples and can include a processor 429. System 428 can further include a non-transitory machine-readable medium (MRM) 430, on which may be stored instructions, such as instructions 431, 432, 433, 434, and 435. Although the following descriptions refer to a processor and a memory resource, the descriptions may also apply to a system with multiple processors and multiple memory resources. In such examples, the instructions may be distributed (e.g., stored) across multiple non-transitory MRMs and the instructions may be distributed (e.g., executed by) across multiple processors.

Non-transitory MRM 430 may be electronic, magnetic, optical, or other physical storage device that stores executable instructions. Thus, non-transitory MRM 430 may be, for example, Random Access Memory (RAM), an Electrically-Erasable Programmable ROM (EEPROM), a storage drive, an optical disc, and the like non-transitory MRM 430 may be disposed within a device, such as device 100, 206, or 312. In this example, the executable instructions 431, 432, 433, 434, and 435 can be "installed" on the device, Additionally and/or alternatively, non-transitory MRM 430 can be a portable, external or remote storage medium, for example, that allows system 428 to download the instructions 431, 432, 433, 434, and 435 from the portable/external/remote storage medium. In this situation, the executable instructions may be part of an "installation package". As described herein, non-transitory MRM 430 can be encoded with executable instructions for image transfer.

The processor 429 may include processing circuitry such as a hardware processing unit such as a microprocessor, microcontroller, application specific instruction set processor, coprocessor, network processor, or similar hardware circuitry that may cause machine-readable instructions to be executed. In some examples, the processor 429 may be a plurality of hardware processing units that may cause machine-readable instructions to be executed. The processor 429 may include central processing units (CPUs) among other types of processing units.

Instructions 431, when executed by a processor such as processor 429, can include instructions to receive a request for transfer of an image including user and device configuration information to a computing device. The image can be stored in the non-transitory MRM 430 for a threshold period of time. For instance, storage of the image may be temporary. The image may be stored for a particular time period (e.g., a common image expected to be serviced a plurality of times over that particular time period), it may be stored until it is successfully transferred to the computing device, or it may be stored until it is successfully transferred to the computing device plus a buffer amount of time for fixes. In some examples, the image may be accessed for final customization of an image, so the image may be stored until the final customization is complete. Once the request (e.g., for an update, reconfiguration, etc.), is received the image may be retrieved from the non-transitory MRM 430.

Instructions 432, when executed by a processor such as processor 429, can include instructions to perform an integrity check of the image. The integrity check can confirm the image's integrity and prevent corruption of the computing device. Instructions 433, when executed by a processor such as processor 429, can include instructions to transfer the image to the computing device over a local network of a service cubby housing the computing device responsive to a positive integrity check result. The local network can couple the non-transitory MRM 430 to the computing device. In some examples, a memory device of the service cubby is coupled to the non-transitory MRM 430 and the computing device via the local network.

Instructions 434, when executed by a processor such as processor 429, can include instructions to abort the image transfer responsive to a negative integrity check result. In such an example, when the integrity of the image is in question, transfer is stopped. If a backup of the image has been created, that backup can be transferred to the computing device, and the image process can be restarted. The image may undergo troubleshooting or re-downloading to the device in such an example.

Instructions 435, when executed by a processor such as processor 429, can include instructions to remove the image from the non-transitory machine-readable medium upon passage of the threshold period of time. For instance, the threshold period of time can include an amount of time in which the image is transferred to the computing device and communication to the computing device to the local network is removed.

In some examples, the image is a copy of a master image. The non-transitory MRM 430 can include instructions (not illustrated) that when executed by a processor such as processor 429 can retain the master image for a threshold period of time subsequent to removal of the copy of the master image. For instance, prior to transfer, a copy of the master image is made and adjusted according to the needs of a particular computing device, and the copy is transferred to the computing device. The copy is then removed from the non-transitory MRM 430, but the master is retained for the threshold period of time (e.g., days, weeks, until transferred to a network server, etc.).

Figure 5:
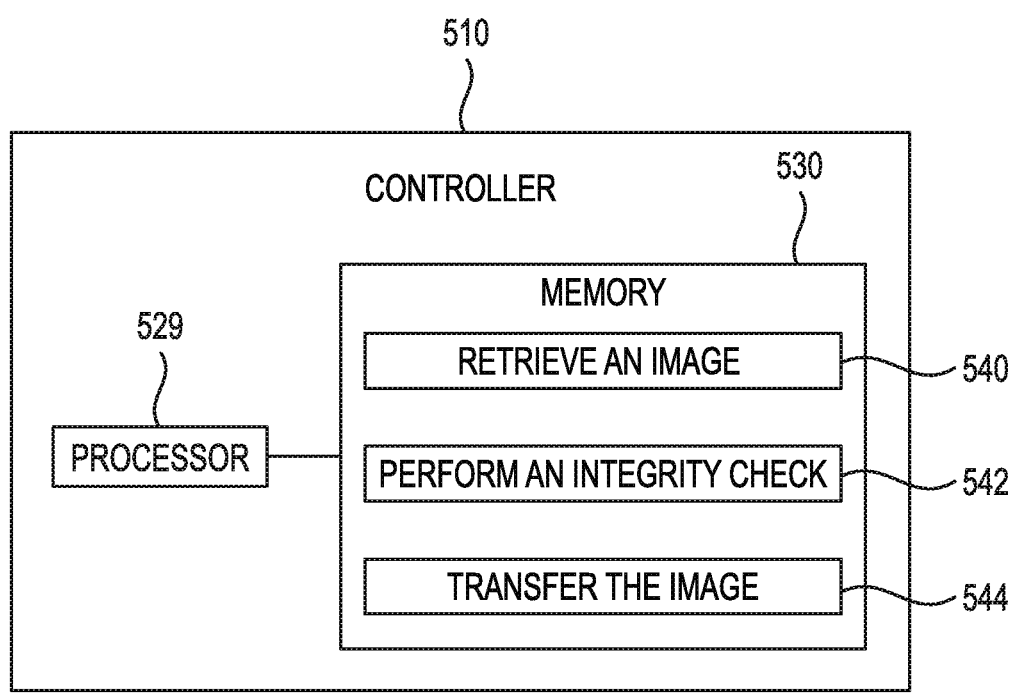
FIG. 5 is an example controller including a processor and a non-transitory machine-readable memory for image transfer consistent with the disclosure.

FIG. 5 is an example controller 510 including a processor 529 and a non-transitory machine-readable memory 530 for image transfer consistent with the disclosure. The controller 510 may be analogous to controllers 210 and 310 as illustrated in FIGS. 2 and 3, respectively. The processor 529 may be analogous to processor 429 illustrated in FIG. 4 and the memory 530 can be analogous to non-transitory machine readable medium 430 illustrated in FIG. 4.

The memory 430 stores instructions thereon, such as instructions 540, 542, and 544. When executed by the processor 529, the instructions cause the controller 510 to perform specific tasks and/or functions. For example, the memory 530 stores instructions 540 which are executed by the processor 529 to cause the controller 510 to retrieve an image. In some examples, a user may be notified that his or her computing device needs an update, reconfiguration, etc. and that he or she should come to a device housing the controller 511 for the update, reconfiguration, etc. The user may also go to the device at a scheduled time or other reason. The user can connect the computing device to the device (e.g., via a component in a service cubby of the device) and the device can either automatically recognize the computing device or the user can interact with the device to request the image, Responsive to this connection/request, the image can be retrieved.

In some examples, content including an image or images (e.g., different images, configurations, files, etc.) may be downloaded to the memory 530 for the purpose of having the content readily available for computing device servicing, further reducing service time. For instance, the memory 530 may store images such as a program that is available for installation on computing devices, a variety of operating system images, and other settings, among others. The stored content can be monitory by a central repository or controller to make sure the content is kept up to date and modified according to anticipated needs of the computing devices.

In some examples, the memory 530 stores instructions 542 which are executed by the processor 529 to cause the controller 510 to perform an integrity check on the image, for instance using a check sum integrity checking scheme. Because the image is first transferred to storage on memory 530 and an integrity check is performed before transfer, examples of the present disclosure can monitor the integrity of the image prior to computing device setup, which can prevent bricking of the computing device due to a bad image.

In some examples, the memory 530 stores instructions 544 which are executed by the processor 529 to transfer the image from the memory 530 to the computing device. In some examples, an existing image on the computing device can be transferred to the memory 530 so a backup exists. Subsequently, the image is transferred from the memory 530 to the computing device. If a problem occurs with the transfer, a copy of the existing image is stored on the memory 530 that can be restored to the computing device, and the image transfer process can be restarted. Image transfer to the computing device can be faster as compared to other approaches because the image is already stored in the memory 530, so transfer across a network is not necessary. In addition, the transfer can occur regardless of network interruption. In some examples, a computing device's capacity may not be overrun during image transfer because the image is stored on memory 530, meaning the amount of storage available on the computing device is irrelevant for image transfer purposes. In addition, images stored locally on the memory 530 may prevent having to use off-site network storage each time an image is deployed to a computing device. This can reduce network bandwidth requirements and can allow pre-staging of content (e.g., downloading content to the memory 530) to reduce service time.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. Further, as used herein, "a number of" an element and/or feature can refer to any number of such elements and/or features.

What is claimed:

1. A device, comprising:
a memory device;
a service cubby to house a computing device and coupled to the memory device; and
a controller coupled to the memory device to:
retrieve, from the memory device, an image requested for transfer to the computing device in the memory device;
perform an integrity check on the image;
transfer, via a local network of the device when a result of the integrity check is positive, the image to the computing device while the computing device is coupled to the service cubby; and
abort, when the result of the integrity check is negative, transfer of the image to the computing device.

2. The device of claim 1, wherein the device is a device-as-a-service (DaaS) kiosk.

3. The device of claim 1, further comprising the controller to:
store the image in the memory device temporarily; and
remove the temporarily stored image after a threshold time period.

4. The device of claim 1, further comprising the controller to:
store the image in the memory device temporarily; and
remove the temporarily stored image upon completion of transfer of the image to the computing device.

5. The device of claim 1, wherein the service cubby includes power, communication capabilities, and connection to the local network.

6. The device of claim 1, wherein the memory device comprises a partitioned memory device.

7. A device, comprising:
a memory device;
a plurality of service cubbies, wherein each one of the plurality of service cubbies facilitates physical storage of one of a plurality of computing devices and is coupled to the memory device; and
a controller to:
responsive to coupling of a first computing device of the plurality of computing devices to the device, store on the memory device an existing image of the first computing device;
retrieve from the memory device a new image for transfer to the first computing device;
perform an integrity check of the new image;
transfer, via a local network of a first service cubby of the plurality of service cubbies when result of the integrity check is positive, the new image to the first computing device while the computing device is in the first service cubby;
abort, when the result of the integrity check is negative, transfer of the image to the first computing device; and
remove the existing image of the first computing device and the new image from the memory device after a threshold time period.

8. The device of claim 7, further comprising the controller to:
responsive to coupling of a second computing device of the plurality of computing devices to the device, storing on the memory device an existing image of the second computing device;
retrieve from the memory device the new image for transfer to the second computing device;
perform an integrity check of the new image;
transfer, via a local network within the device, the new image to the second computing device while the second computing device is in a second one of the plurality of service cubbies; and
remove the existing image of the second computing device and the new image from the memory device after a threshold time period.

9. The device of claim 7, wherein the device is not connected to an external network.

10. The device of claim 7, wherein the existing image of the first computing device includes configuration information associated with the first computing device.

11. The device of claim 7, wherein the threshold time period comprises a time it takes for the device to transfer the new image to a particular number of computing devices.

12. A non-transitory machine-readable medium having instructions that when executed by a processor cause the processor to:

receive a request for transfer of an image including user and device configuration information to a computing device,
wherein the image is stored in the non-transitory machine-readable medium for a threshold period of time;
perform an integrity check of the image;
responsive to a positive integrity check result, transfer the image to the computing device over a local network of a service cubby housing the computing device,
wherein the local network couples the non-transitory machine-readable medium to the computing device;
responsive to a negative integrity check result, abort the image transfer; and
remove the image from the non-transitory machine-readable medium upon passage of the threshold period of time.

13. The non-transitory machine-readable medium of claim 12, wherein the threshold period of time is an amount of time in which the image is transferred to the computing device and communication to the computing device to the local network is removed.

14. The non-transitory machine-readable medium of claim 12, wherein:
the non-transitory machine-readable medium is coupled to a memory device of the service cubby via the local network; and
the memory device of the service cubby is coupled to the computing device via the local network.

15. The non-transitory machine-readable medium of claim 12, wherein:
the image is a copy of a master image; and
wherein the non-transitory machine-readable medium comprises instructions that when executed by the processor cause the processor to retain the master image for a second threshold period of time subsequent to removal of the copy of the master image.

* * * * *